US012422113B1

(12) United States Patent
Irons

(10) Patent No.: US 12,422,113 B1
(45) Date of Patent: Sep. 23, 2025

(54) ENDCAP AND METHOD FOR MAKING LUMINAIRE WITH ENDCAP

(71) Applicant: Elemental LED, Inc., Reno, NV (US)

(72) Inventor: Travis Irons, Reno, NV (US)

(73) Assignee: Elemental LED, Inc., Reno, NV (US)

( * ) Notice: Subject to any disclaimer, the term of this patent is extended or adjusted under 35 U.S.C. 154(b) by 0 days.

(21) Appl. No.: 18/748,030

(22) Filed: Jun. 19, 2024

(51) Int. Cl.

| | |
|---|---|
| ***F21S 4/28*** | (2016.01) |
| ***F21V 15/01*** | (2006.01) |
| ***F21V 15/015*** | (2006.01) |
| ***F21V 31/04*** | (2006.01) |
| *F21Y 103/10* | (2016.01) |
| *F21Y 115/10* | (2016.01) |

(52) U.S. Cl.
CPC .............. *F21S 4/28* (2016.01); *F21V 15/013* (2013.01); *F21V 15/015* (2013.01); *F21V 31/04* (2013.01); *F21Y 2103/10* (2016.08); *F21Y 2115/10* (2016.08)

(58) Field of Classification Search
CPC ........ F21S 4/28; F21V 15/013; F21V 15/015; F21V 31/04
See application file for complete search history.

(56) References Cited

U.S. PATENT DOCUMENTS

| | | | | |
|---|---|---|---|---|
| 10,801,716 | B1 * | 10/2020 | Lopez-Martinez | F21V 15/01 |
| 11,592,171 | B1 | 2/2023 | McKay | |
| 11,959,602 | B1 | 4/2024 | Mckay et al. | |
| 2017/0311422 | A1 * | 10/2017 | Arai | F21V 23/001 |
| 2018/0306413 | A1 * | 10/2018 | Tremaine | F21V 31/04 |
| 2019/0150372 | A1 * | 5/2019 | Golle | A01G 7/045 |

FOREIGN PATENT DOCUMENTS

| | | | |
|---|---|---|---|
| DE | 202018003506 U1 * | 9/2018 | F21K 9/272 |

* cited by examiner

*Primary Examiner* — Abdulmajeed Aziz
*Assistant Examiner* — Nathaniel J Lee
(74) *Attorney, Agent, or Firm* — Andrew McAleavey

(57) ABSTRACT

A linear luminaire includes a rigid channel having at least one compartment. At least one strip of LED linear lighting is disposed in the at least one compartment. A pair of endcaps adhere to and cover end faces of the channel to close ends of the at least one compartment. Neither of the pair of endcaps has any structure protruding into the at least one compartment of the channel. A resin fills the at least one compartment of the channel. A method for making the linear luminaire includes damming the at least one compartment of the channel with the pair of endcaps and filling the at least one compartment with the resin.

18 Claims, 5 Drawing Sheets

ENDCAP AND METHOD FOR MAKING LUMINAIRE WITH ENDCAP

TECHNICAL FIELD

The disclosure relates to an endcap for a linear luminaire, and to a method of making the linear luminaire.

BACKGROUND

A linear luminaire is a long, typically narrow finished lighting fixture. Linear luminaires are usually constructed by placing a strip of LED linear lighting in a channel, connecting that strip of LED linear lighting to a power cord, and then closing the channel with a cover and endcaps. The channel itself is often rigid, made, e.g., from an aluminum or steel extrusion, which may be anodized, powder coated, or otherwise finished. In some cases, channels are made of rigid plastics, like PVC or polycarbonate.

Typical endcaps are made of injection-moldable plastics. They usually have features, like ribs, that protrude into the channel. While some endcaps are designed to be press-fit or snapped into the channel, many are secured in the channel by use of adhesives. In addition to its interior-channel features, a typical endcap may have about 2 mm of thickness that protrudes outside of the channel.

There are many issues with typical endcaps. First, the inwardly-protruding features of the endcaps take up space within the channel, space that might otherwise be filled by the strip of LED linear lighting. Thus, when using traditional endcaps, there may be dark areas toward both ends of a channel, because the strip of LED linear lighting terminates before the end of the channel in order to allow space for the endcap. Certain features of endcaps may also throw shadows when the linear luminare is illuminated.

Additionally, finished linear luminaires can only be made to a certain maximum length, e.g., 8 feet (2.4 m). If a longer line of light is needed, the usual approach is to abut two shorter linear luminaires end-to-end. However, if each channel endcap has an exterior thickness of 2 mm, and two luminaires are abutted end-to-end, there may be a length of 4 mm or more with no illumination. That may create a discontinuous dark spot that is noticeable, even to the casual observer.

With some specific types of linear luminaires, and with some specific manufacturing processes, attempts have been made to omit endcaps. For example, U.S. Pat. No. 10,801,716 discloses processes for creating sealed linear luminaires using encapsulating resins. In these processes, a length of polymeric channel is cut, and that channel is then sealed at each end with a removable rubber stopper. Resin is poured into the stoppered channel, over a strip of LED linear lighting, and the stoppers are removed. Although this process is useful in creating a certain type of linear lighting, it has its drawbacks. For example, when the stoppers are removed, there is some length of unfilled channel at each end, which must be cut away after manufacture-without damaging the otherwise-finished luminaire. Moreover, even though this patent omits separate endcaps, it recognizes the need to keep light from escaping through the ends of the linear luminaire: as a last manufacturing step, the stoppers are moved back from their initial positions, and an additional layer of translucent or opaque resin is poured into the gaps formed by the repositioning of the stoppers in order to block light from escaping through the ends of the linear luminaire.

BRIEF SUMMARY

A linear luminaire according to one aspect of the disclosure includes a rigid channel having at least one compartment. At least one strip of LED linear lighting is disposed in the at least one compartment. A pair of endcaps adhere to and cover end faces of the channel to close ends of the at least one compartment. Neither of the pair of endcaps has any structure protruding into the at least one compartment of the channel. A resin fills the at least one compartment of the channel.

In some embodiments according to this aspect, each of the pair of endcaps may have a flat inner face, a flat outer face, and a thickness of less than about 0.5 mm. Each of the pair of endcaps may have a pressure-sensitive adhesive on its inner face.

A method for making the linear luminaire according to another aspect of the disclosure includes damming the at least one compartment of the channel with the pair of endcaps and filling the at least one compartment with the resin. The resin bonds to the pair of endcaps and further secures them to the channel.

Other aspects, features, and advantages of the invention will be set forth in the following description.

BRIEF DESCRIPTION OF THE DRAWING FIGURES

The invention will be described with respect to the following drawing figures, in which like numerals represent like features throughout the description, and in which.

DETAILED DESCRIPTION

Figure 1:
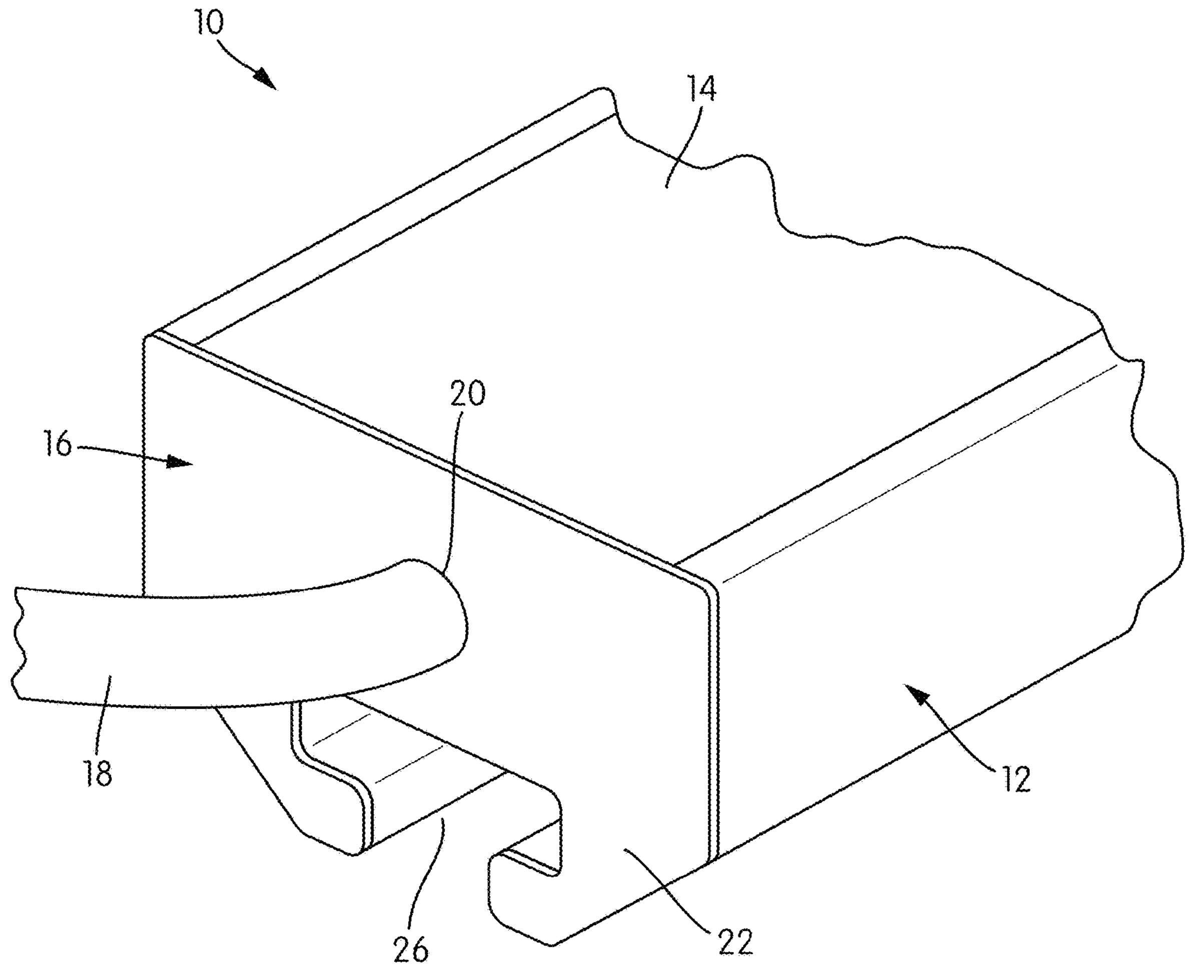
FIG. 1 is a perspective view of an end portion of a linear luminare according to one embodiment of the invention, illustrating an endcap.

FIG. 1 is a perspective view of the end portion of a linear luminaire, generally indicated at 10, according to one embodiment of the invention. The linear luminaire 10 includes a channel 12 that is filled with a resin 14 and terminates in an endcap 16. A power cable 18 is connected to a strip of LED linear lighting within the resin 14 and transits through an opening 20 in the endcap 16 to exit the linear luminaire 10. The strip of LED linear lighting is not shown in FIG. 1.

The channel 12 in the illustrated embodiment is made of a rigid metal, such as aluminum, and may be anodized, painted, powder coated, or otherwise surface-treated. Such channels 12 are typically made by extrusion in long lengths (e.g. up to 8 ft (2.4 m), although in some embodiments, the channel 12 may be cast, machined, or manufactured in some other way. In some cases, a channel 12 may also be made of rigid plastics, e.g., polycarbonate, poly(methyl methacrylate) (PMMA), or poly(vinyl chloride) (PVC). As used here, the term "rigid" means that the channel 12 will not deform under its own weight.

The endcap 16 matches the shape of the end of the channel 12 and closes the resin-filled compartment of the channel 12. However, the endcap 16 differs in several respects from prior art endcaps. First, as can be seen in FIG. 1, the endcap 16 is thin. For example, in some embodiments, the endcap 16 may be 0.25 mm (0.01 in) thick. Second, the endcap 16 has no structure that projects into the channel 12. Instead, the endcap 16 has two sides, an outward side 22 and an inward side 24 (best seen in FIGS. 6-9), that are at least generally flat and parallel with one another. As can be seen in FIG. 1, the endcap 16 terminates at the edges of the end face 68 that it covers.

Figure 2:
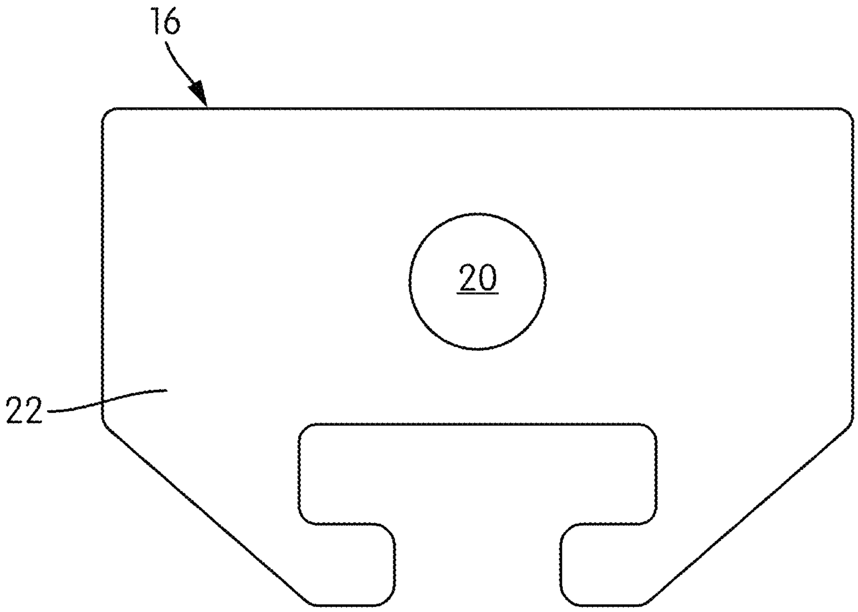
FIGS. 2-5 are elevational views of endcaps according to various embodiments.

Endcaps according to embodiments of the invention may have many different shapes and are generally made so as to match the shape of the end of the channel 12 that they are intended to close. If a channel has more than one compartment (e.g., upper and lower compartments), the endcap may be shaped to cover at least one of the compartments. FIG. 2 is an elevational view of the endcap 16 of FIG. 1. The channel 12 of FIG. 1 has a generally rectilinear upper compartment defined by two parallel sides spaced from one another along a bottom, and a lower T-slot 26. The endcap 16 is shaped such that it covers the end of the entire upper compartment of the channel 12 but leaves the lower T-slot 26 open at the end.

Figure 3:
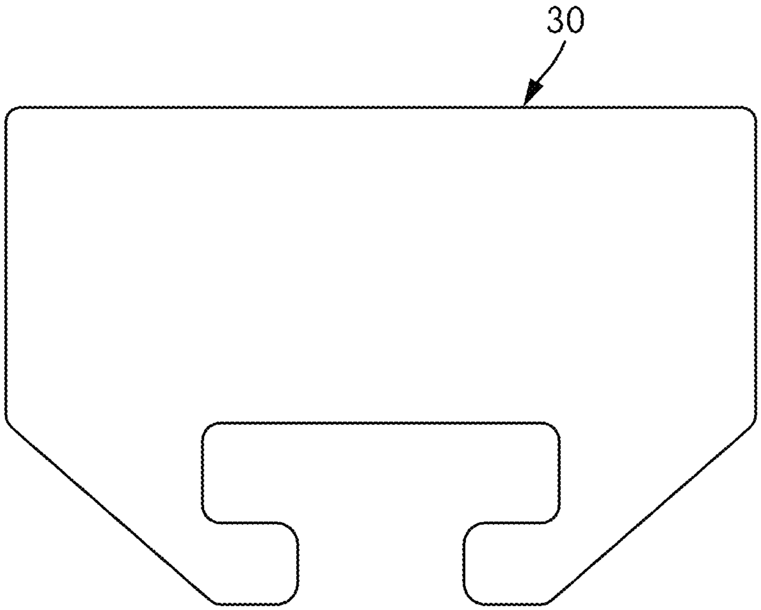

In most cases, a linear luminaire 10 is powered only from one end of the channel 12. Thus, while the endcap 16 has an opening 20 for the power cable 18, its counterpart on the other end of the linear luminaire 10 would typically not have an opening. FIG. 3 is an elevational view of a counterpart endcap 30 with no opening. However, this is not a hard-and-fast rule: if a linear luminaire 10 has a strip of LED linear lighting that is powered from both ends, or if it has multiple strips of LED linear lighting, each of which is powered from a different end, then it may use two endcaps 16 with openings 20.

Endcaps 16 according to embodiments of the invention can be made in essentially any shape to match the shape of the channel 12 with which they are to be used. An endcap 16 would typically be made of a thin plastic, such as polycarbonate or PMMA, and may be laser-cut, die cut, molded, extruded and cut into thin sections, or made in any other suitable way. If an endcap 16 is made of a plastic, the plastic may be colored so that it at least somewhat matches the surface coloring of the channel 12. Endcaps 16 made of thin sheet metal, e.g., aluminum or steel, are also possible, and such endcaps 16 could be surface-treated in the same way that the channel 12 itself is surface-treated.

Figure 4:
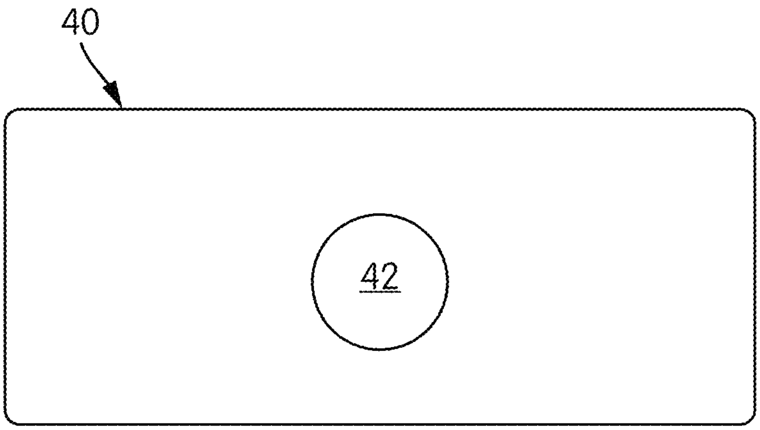
Figure 5:
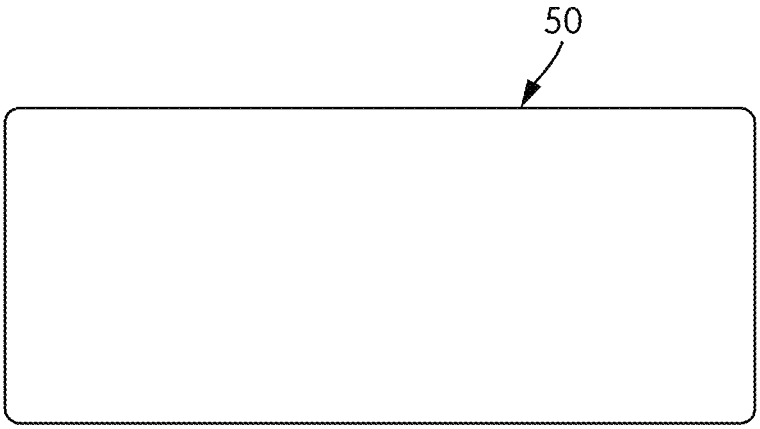

As another example of a possible shape, FIGS. 4 and 5 are elevational views of a rectangular endcap 40 with an opening 42 and its counterpart endcap 50 with no opening.

Figure 6:
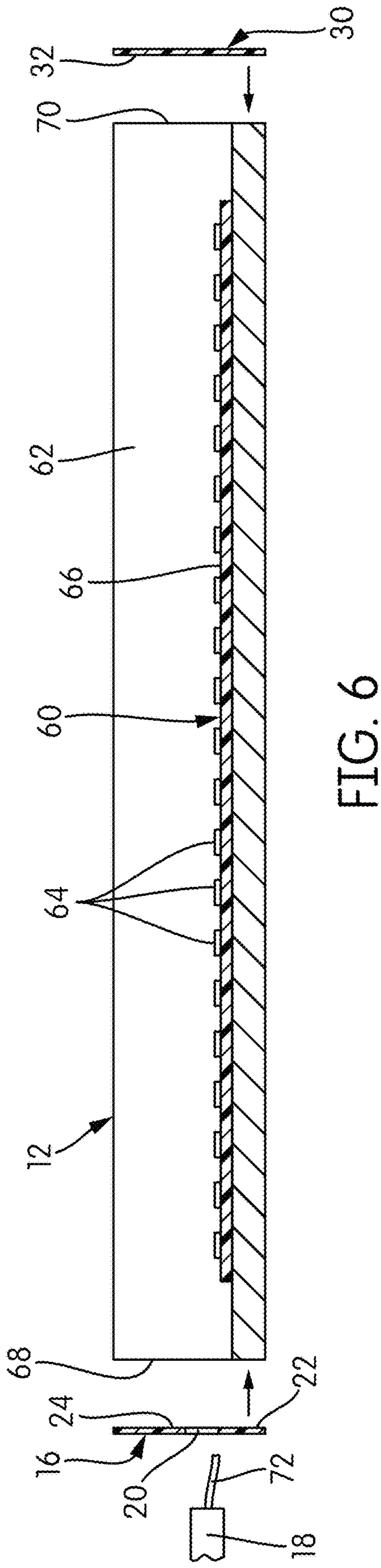
FIG. 6 is an exploded cross-sectional view of the linear luminaire of FIG. 1, illustrating the placement of the endcaps on the linear luminaire.

FIG. 6 is an exploded longitudinal cross-section of the linear luminaire 10, illustrating its manufacture. In FIG. 6, a strip of LED linear lighting 60 has been placed in the upper compartment 62 of the channel 12. The strip of LED linear lighting 60 has a number of LED light engines 64 spaced along a printed circuit board (PCB) 66 at a regular pitch. The PCB may be either flexible or rigid. A rigid PCB 66 may be made of a material like FR4 composite, ceramic, aluminum or the like. A flexible PCB 66 may be made, e.g., from a polyester film, like biaxially-oriented polyethylene terephthalate (BoPET; MYLAR®) or a polyimide.

The term "LED light engine" refers to one or more LEDs packaged with all other elements necessary to emit light. The precise nature of the LED light engine 64 is not critical. For example, the LED light engine 64 may emit a colored light, like red, blue, or green light. In many cases, the LED light engine 64 may be configured to emit so-called "white" light. As those of skill in the art would appreciate, "white" light is light that has a collection of different light wavelengths. The precise power spectrum of that light varies considerably. In some cases, an LED light engine 64 adapted to emit "white" light may be a so-called "blue pump" LED light engine 64, in which a blue-light emitting LED is topped with a phosphor, a chemical mix that absorbs the blue light and re-emits a broader or different spectrum of light. "White" light may also be achieved by an RGB LED light engine, which includes red, green, and blue LEDs in the same light engine and can additively mix those colors to achieve "white" light. If the LED light engines 64 emit white light, that light may be of any color temperature. LED light engines 64 may also be of different types, e.g., organic light-emitting diodes (OLEDs) and other such technologies.

The strip of LED linear lighting 60 may be either low voltage (for purposes of this description, operating with a voltage under 50V) or high voltage, and it may include any number of different types of LED light engines 64. In addition to the LED light engines 64, the PCB 66 may include other components, such as components to set the current in the electric circuit, like resistors or current-limiting integrated circuits (ICs).

As shown in FIG. 6, the endcaps 16, 30 are installed on the end faces 68, 70 of the channel 12. Typically, the inward sides 24, 32 of the endcaps 16, 30 include an adhesive, at least in the areas where they are expected to make contact with the end faces 68, 70. The adhesive is typically a tacky, pressure-sensitive adhesive, such as 3M 200 MP adhesive (3M, Inc., St. Paul, Minnesota, United States), that is coated on the inward side 24, 32, typically with a release layer to protect the adhesive until it is used. Alternately, the pressure-sensitive adhesive may be provided on a transfer tape that is applied to the inward sides 24, 32 of the endcaps 16, 30 just before application. 3M 468 MP transfer tape is one suitable example. Pressure-sensitive adhesives do not usually require prolonged clamping, but if an epoxy or another type of adhesive is used, the endcaps 16, 30 may be clamped after installation on the end faces 68, 70 of the channel 12. If necessary, the end faces 68, 70 could be prepared for bonding by, e.g., sanding off any surface coating or treatment, cleaning off any oils or debris, etc.

Figure 7:
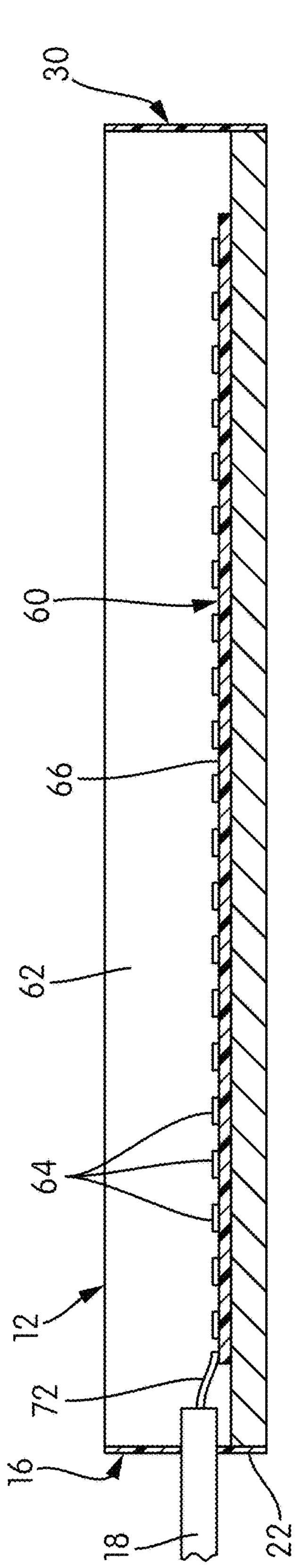
FIGS. 7-9 are cross-sectional views of the linear luminaire, similar to the view of FIG. 6, illustrating steps in finishing the manufacture of the linear luminaire.

As is also shown in FIG. 6 and in FIG. 7, a view similar to FIG. 6 with the endcaps 16, 30 installed, either before installation or just after, the power cable 18 is inserted through the opening 20 and its leads, shown collectively at 72, are connected to the PCB 66, usually by soldering.

Once the endcaps 16, 30 and the power cable 18 are installed, the upper compartment 62 of the channel 12 is filled with an encapsulating resin 14. The encapsulating resin 14 is typically in the form of a low-viscosity liquid that can flow around the strip of LED linear lighting 60 and its LED light engines 64. The encapsulating resin 14 may be, for example, a two-part polyurethane or silicone resin that is mixed, de-gassed, and dispensed into the upper compartment 62. This may be done by hand, i.e., by mixing two components, de-gassing in a vacuum chamber, and dispensing. However, it is more conveniently done by appropriate machinery. There are many resin mixing and dispensing machines that could be used for such a task, some of which actually store and mix the resin components under vacuum to avoid the need to de-gas. The DEMAK CV SMART line of dispensing machines (DEMAK Group, Torino, Italy) is one suitable line of machines of this type.

Figure 8:
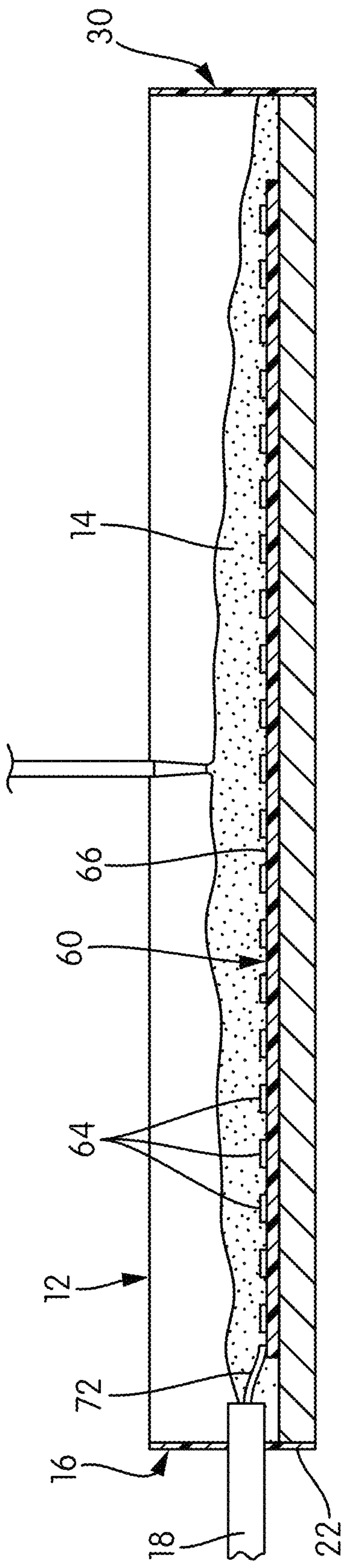

FIG. 8, a cross-sectional view similar to that of FIGS. 6 and 7, illustrating the filling of the upper compartment 62 with resin 14. FIG. 8 illustrates the filling taking place in a single step: the compartment 62 is completely filled with resin 14, with the endcaps 16, 30 acting as dams, and then the resin 14 is caused or allowed to cure. The phrase "caused or allowed" is used here to mean that in some circumstances, the resin may be caused to cure by, e.g., exposing it to elevated temperatures (e.g. 35-65° C.) or certain types of radiation (e.g., UV), while in other embodiments, a one- or two-part resin system will simply cure in ambient conditions, with no special action taken other than to allow it to do so. In many cases, a resin will cure in ambient conditions, but will cure faster if exposed to elevated temperatures. Some dispensing machines have motorized beds that can be shuttled into curing ovens or other curing devices. In those cases, causing the resin to cure may comprise moving the resin-bearing channel 12 into the curing ovens or other curing devices for some period of time.

Although FIG. 8 essentially illustrates the filling as a single-step process, it may not be. There are many techniques that may be used in the filling and curing of the resin 14. For example, the resin 14 may be filled and cured in several thinner layers. Doing so may help to prevent air bubbles, especially around the LED light engines 64. Any bubbles that do form may be popped by brief exposure to heat, e.g., using a butane or propane torch. The resin 14 may be entirely transparent, or it may be translucent, including an additive that scatters or diffuses at least some of the emitted light. U.S. Pat. Nos. 10,801,716, 11,592,171, and 11,959,602 provide information on various techniques on working with resin, and all of those patents are incorporated by reference herein in their entireties. Notably, the compartment 62 need not be filled entirely with liquid resin. In some embodiments, a pre-cured or extruded piece of resin or plastic may be placed overtop of the strip of LED linear lighting 64 and a thin layer of resin dispensed overtop of that piece. However, linear luminaires 10 according to embodiments of the invention will generally involve at least some use of liquid resins.

Figure 9:
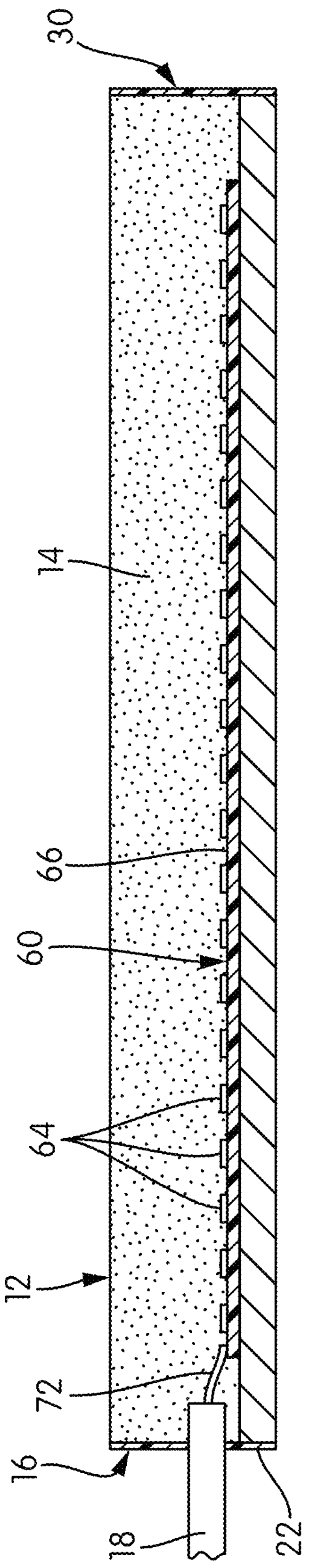

FIG. 9 is a view similar to the view of FIG. 8, illustrating the channel 12 with filled and cured resin 14 therein. The view of FIG. 9 assumes that the compartment 62 is entirely filled with resin 14, although as noted above, that need not be the case.

The use of resin encapsulation in combination with the thin, adhesively-adhered endcaps 16, 30 has an advantage: alone, the endcaps 16, 30 may or may not be able to be mounted securely on the channel 12. Adhesive alone could conceivably fail at some point during the lifetime of the linear luminaire 10, especially as the endcaps 16, 30 are exposed to heat generated by the LED light engines 64. However, the present inventor has found that adhesively-secured endcaps 16, 30 are quite suitable as dams when one is using poured encapsulating resins-using only adhesive, the endcaps 16, 30 are secured well enough to prevent liquid resin from leaking out during manufacture. As the resin cures, it bonds adhesively to the endcaps 16, 30 and secures them permanently. For these reasons, the endcaps 16, 30 may be of any thickness and may use any adhesive so long as they have enough mechanical rigidity and bond strength to hold against the weight of the liquid resin 14 during manufacture. Endcaps 16, 30 according to embodiments of the invention will usually be no thicker than about 0.50 mm (0.02 in), but in some cases, thicker endcaps 16, 30 could be made. In linear luminaires 10 according to embodiments of the invention, the strip of linear lighting 60 may extend as close to the ends of the channel 12 as possible.

Although there are advantages to filling the channel 12 with a resin 14, it is entirely possible that adhesively-adhered endcaps 16, 30 with no inwardly-extending structure may be able to stay in place without a resin fill. This is a function primarily of the surface area of the end faces 68, 70 of the channel 12, the nature of the adhesive used with the endcaps 16, 30, and the environment in which the finished luminaire is to be used. In these cases, if no resin fill is used, a snap-on cover would be used to close the top of the channel 12. The result would appear much like FIG. 1.

This description uses the term "about." When that term is applied to a numerical value or range, it means that the value or range may change, so long as the described end result does not. If it cannot be determined what value or range would not cause the described end result to change, "about" should be construed as meaning ±10%.

While the invention has been described with respect to certain embodiments, the description is intended to be exemplary, rather than limiting. Modifications and changes may be made within the scope of the invention, which is defined by the appended claims.

What is claimed is:

1. A linear luminaire, comprising:
a rigid channel having at least one compartment;
at least one strip of LED linear lighting disposed in the at least one compartment;
a pair of endcaps adhered to and covering end faces of the channel to close ends of the at least one compartment, such that an endcap of the pair of endcaps is adhered to each of the end faces of the channel so as to close the at least one compartment, the endcap terminating at lateral edges of the end face to which the endcap is adhered and having no structure protruding into the at least one compartment of the channel; and
a resin fill in the at least one compartment of the channel.

2. The linear luminaire of claim 1, further comprising:
a power cable connected to the at least one strip of LED linear lighting; and
wherein at least one of the pair of endcaps defines an opening sized to allow the power cable to pass.

3. The linear luminaire of claim 1, wherein each of the pair of endcaps has a layer of pressure-sensitive adhesive on an inner face thereof.

4. The linear luminaire of claim 1, wherein each of the pair of endcaps has a flat inner face, a flat outer face, and a thickness of less than about 0.5 mm.

5. The linear luminaire of claim 4, wherein each of the pair of endcaps has a thickness of 0.25 mm.

6. The linear luminaire of claim 4, wherein each of the pair of endcaps is formed of polycarbonate, poly(methyl methacrylate), or sheet metal.

7. A method, comprising:
damming end faces of at least one compartment of a rigid channel with a pair of endcaps, such that an endcap of the pair of endcaps is adhered to each of the end faces of the at least one compartment of the channel, each endcap being matched in shape to the end face of the at least one compartment to which the endcap is adhered, the endcap terminating at lateral edges of the end face and having no structure protruding into the at least one compartment of the channel; and
filling the at least one compartment of the channel with a resin fill;
wherein the at least one compartment includes at least one strip of LED linear lighting that is encapsulated by said filling.

8. The method of claim 7, further comprising:
before said filling, inserting a power cable through an opening in one of the pair of endcaps sized to allow the power cable to pass; and
connecting leads of the power cable to the at least one strip of LED linear lighting.

9. The method of claim 7, wherein each of the pair of endcaps has a layer of pressure-sensitive adhesive on an inner face thereof.

10. The method of claim 7, wherein each of the pair of endcaps has a flat inner face, a flat outer face, and a thickness of less than about 0.5 mm.

11. The method of claim 10, wherein each of the pair of endcaps has a thickness of 0.25 mm.

12. The method of claim 10, wherein each of the pair of endcaps is formed of polycarbonate, poly(methyl methacrylate), or sheet metal.

13. A linear luminaire, comprising:

a rigid channel having at least one compartment;

at least one strip of LED linear lighting disposed in the at least one compartment; and an endcap adhered to each end face of the at least one compartment of the channel so as to close the at least one compartment, the endcap terminating at lateral edges of the end face and having no structure protruding into the at least one compartment of the channel.

14. The linear luminaire of claim 13, further comprising:

a power cable connected to the at least one strip of LED linear lighting; and wherein the endcap defines an opening sized to allow the power cable to pass.

15. The linear luminaire of claim 13, wherein the endcap has a layer of pressure-sensitive adhesive on an inner face thereof.

16. The linear luminaire of claim 13, wherein the endcap has a flat inner face, a flat outer face, and a thickness of less than about 0.5 mm.

17. The linear luminaire of claim 16, wherein the endcap has a thickness of 0.25 mm.

18. The linear luminaire of claim 16, wherein the endcap is formed of polycarbonate, poly(methyl methacrylate), or sheet metal.

* * * * *